US007266582B2

(12) United States Patent
Stelting

(10) Patent No.: US 7,266,582 B2
(45) Date of Patent: Sep. 4, 2007

(54) METHOD AND SYSTEM FOR AUTOMATING GENERATION OF WEB SERVICES FROM EXISTING SERVICE COMPONENTS

(75) Inventor: Stephen A. Stelting, Broomfield, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 855 days.

(21) Appl. No.: 10/215,552

(22) Filed: Aug. 9, 2002

(65) Prior Publication Data

US 2004/0030740 A1    Feb. 12, 2004

(51) Int. Cl.
G06F 15/16 (2006.01)
(52) U.S. Cl. ................ 709/201; 719/315; 719/319
(58) Field of Classification Search ................ 709/201, 709/203, 217, 219, 228, 231, 230, 249, 212, 709/220, 200, 318, 223, 229, 250, 246; 725/32, 725/105; 714/4; 379/121; 705/1
See application file for complete search history.

(56) References Cited

U.S. PATENT DOCUMENTS

| 6,157,942 | A | * | 12/2000 | Chu et al. .................... 709/203 |
| 6,430,276 | B1 | * | 8/2002 | Bouvier et al. ......... 379/121.01 |
| 6,453,335 | B1 | * | 9/2002 | Kaufmann .................. 709/203 |
| 6,466,971 | B1 | * | 10/2002 | Humpleman et al. ....... 709/220 |
| 6,594,692 | B1 | * | 7/2003 | Reisman ..................... 709/219 |
| 6,606,744 | B1 | * | 8/2003 | Mikurak ..................... 717/174 |
| 6,697,824 | B1 | * | 2/2004 | Bowman-Amuah ......... 709/229 |
| 6,732,177 | B1 | * | 5/2004 | Roy ............................ 709/227 |
| 6,802,068 | B1 | * | 10/2004 | Guruprasad .................. 719/319 |
| 6,898,618 | B1 | * | 5/2005 | Slaughter et al. ........... 709/203 |
| 6,985,939 | B2 | * | 1/2006 | Fletcher et al. ............. 709/223 |
| 7,013,290 | B2 | * | 3/2006 | Ananian ...................... 705/27 |
| 7,017,175 | B2 | * | 3/2006 | Alao et al. .................. 725/105 |
| 7,035,944 | B2 | * | 4/2006 | Fletcher et al. ............. 709/250 |
| 7,043,659 | B1 | * | 5/2006 | Klein et al. .................... 714/4 |
| 7,065,588 | B2 | * | 6/2006 | Konda et al. ............... 709/246 |
| 2002/0108109 | A1 | * | 8/2002 | Harris et al. .................. 725/32 |

(Continued)

OTHER PUBLICATIONS

A new framework for mobile Web services Sheng-Tzong Cheng; Jian-Pei Liu; Jian-Lun Kao; Chia-Mei Chen; Applications and the Internet (SAINT) Workshops, 2002. Proceedings. 2002 Symposium on Jan. 28-Feb. 1, 2002 pp. 218-222.*

(Continued)

*Primary Examiner*—Thong Vu
(74) *Attorney, Agent, or Firm*—Kent A. Lembke; William J. Kubida; Hogan & Hartson LLP

(57) ABSTRACT

A computer-based method for generating a Web service. The method includes identifying first and second service components for inclusion in the Web service, which includes locating available services using service detectors that use differing search techniques and displaying the located services to the user to allow the user to make a selection to identify the first and second service components. The method continues with generating a description or contract for the Web service defining service behavior including invoking rules. A transport structure is then created for accessing the new Web service such as a transmission envelope. The Web service is advertised as being available on the communications network including registering the Web service with a services registry linked to the communications network.

27 Claims, 6 Drawing Sheets

U.S. PATENT DOCUMENTS

| | | | |
|---|---|---|---|
| 2002/0116454 A1* | 8/2002 | Dyla et al. | 709/203 |
| 2002/0128001 A1* | 9/2002 | Shuttleworth | 455/414 |
| 2002/0143819 A1* | 10/2002 | Han et al. | 707/513 |
| 2002/0156844 A1* | 10/2002 | Maehiro | 709/203 |
| 2002/0174178 A1* | 11/2002 | Stawikowski | 709/203 |
| 2002/0174191 A1* | 11/2002 | Robertson et al. | 709/217 |
| 2002/0184310 A1* | 12/2002 | Traversat et al. | 709/204 |
| 2002/0184373 A1* | 12/2002 | Maes | 709/228 |
| 2003/0004746 A1* | 1/2003 | Kheirolomoom et al. | 705/1 |
| 2003/0050990 A1* | 3/2003 | Craddock et al. | 709/212 |
| 2003/0055868 A1* | 3/2003 | Fletcher et al. | 709/201 |
| 2003/0065805 A1* | 4/2003 | Barnes, Jr. | 709/231 |
| 2003/0084177 A1* | 5/2003 | Mulligan | 709/230 |
| 2003/0105884 A1* | 6/2003 | Upton | 709/318 |
| 2003/0135628 A1* | 7/2003 | Fletcher et al. | 709/229 |
| 2003/0149781 A1* | 8/2003 | Yared et al. | 709/229 |
| 2003/0154242 A1* | 8/2003 | Hayes et al. | 709/203 |
| 2003/0163513 A1* | 8/2003 | Schaeck et al. | 709/201 |
| 2003/0191802 A1* | 10/2003 | Zhao et al. | 709/203 |
| 2004/0010612 A1* | 1/2004 | Pandya | 709/230 |
| 2004/0015564 A1* | 1/2004 | Williams | 709/219 |
| 2004/0133656 A1* | 7/2004 | Butterworth et al. | 709/219 |
| 2004/0255048 A1* | 12/2004 | Lev Ran et al. | 709/249 |
| 2005/0021594 A1* | 1/2005 | Bernardin et al. | 709/200 |
| 2005/0038904 A1* | 2/2005 | Dougall | 709/236 |
| 2006/0259949 A1* | 11/2006 | Schaefer et al. | 726/1 |

OTHER PUBLICATIONS

Session authentication protocol for Web services Hada, S.; Maruyama, H.; Applications and the Internet (SAINT) Workshops, 2002. Proceedings. 2002 Symposium on Jan. 28-Feb. 1, 2002 pp. 158-165.*

Bayanihan Computing .NET: grid computing with XML web services Sarmenta, L.F.G.; Chua, S.J.V.; Echevarria, P.; Mendoza, J.M.; Santos, R.-R.; Tan, S.; Lozada, R.P.; Cluster Computing and the Grid 2nd IEEE/ACM International Symposium CCGRID2002 May 21-24, 200.*

* cited by examiner

Step 4 of 5 Identify Input/Output values for Web Service elements

Input One: Order Number

| Type | String | Source | Manual | Value | ON728354 |
|------|--------|--------|--------|-------|----------|

Input Two: Order Amount

| Type | float | Source | Service | Value | getOrderPrice |
|------|-------|--------|---------|-------|---------------|

Output

| Type | boolean |
|------|---------|

[ <Back ] [ Next> ] [ Finish ] [ Cancel ]

*FIG. 6*

Step 5 of 5 Finalize Web Service Creation

Select the technologies to use for the service

- Invocation: SOAP ▼
- Publishing: UDDI ▼
- Packaging: WSDL ▼

[ <Back ] [ Finish ] [ Cancel ]

*FIG. 7*

METHOD AND SYSTEM FOR AUTOMATING GENERATION OF WEB SERVICES FROM EXISTING SERVICE COMPONENTS

BACKGROUND OF THE INVENTION

1. Field of the Invention

The present invention relates, in general, to providing application functions over digital communication networks, and, more particularly, to software, systems and methods for facilitating and, at least partially, automating the creation or generation of Web services from existing Web services, application functions, and/or callable methods.

2. Relevant Background

It is hard to imagine networked computing without the Web, and the Web has succeeded where earlier hypertext schemes failed is most likely its simplicity and ubiquity. From a service provider's (e.g. an e-shop or e-commerce provider) point of view, if they can set up a Web site they can join the global community. From a client's point of view, if you can type, you can access services. From a service interface (e.g., an application programming interface (API)) point of view, the majority of the Web's work is done by three methods (i.e., GET, POST, and PUT) and a simple markup language (e.g., extensible Markup Language (XML)).

Recently, a substantial interest has developed in the business community in the field of Web services, and the Web services movement is driven by the fact that the advantages of the Web as a platform can be applied not only to information but also to services. The Web services movement has resulted in efforts from many companies to produce Web services, in efforts from most of the major companies in the Web products sector to develop products that enable developers to create and deploy Web services, and in efforts from consumer businesses to develop new Web services and to enable their existing systems as Web services.

Generally, a Web service is programmable application logic accessible using standard communication protocols, such as Internet protocols. Web services combine the best aspects of component-based development and the Web. Like components, Web services represent black-box functionality that can be reused without worrying about how the service is implemented. Unlike current component technologies, Web services are not accessed via object-model-specific protocols, such as the distributed Component Object Model (DCOM), Remote Method Invocation (RMI), or Internet Inter-ORB Protocol (IIOP). Instead, Web services are accessed via ubiquitous Web protocols and data formats, such as Hypertext Transfer Protocol (HTTP) and Extensible Markup Language (XML). Furthermore, a Web service interface is defined strictly in terms of the messages the Web service accepts and generates. Consumers of the Web service can be implemented on any platform in any programming language, as long as they can create and consume the messages defined for the Web service interface.

A few key specifications and technologies are usually encountered when building or consuming Web services. These specifications and technologies address: a standard way to represent data; a common, extensible, message format; a common, extensible, service description language; a way to discover services located on a particular Web site; and a way to discover service providers. XML is currently the most popular choice for providing a standard way to represent data. Most Web service-related specifications use XML for data representation. The Simple Object Access Protocol (SOAP) defines one lightweight protocol for information exchange, e.g., for providing an envelope around the XML document. Part of the SOAP specification defines a set of rules for how to use XML to represent data. Other parts of the SOAP specification define an extensible message format, conventions for representing remote procedure calls (RPCs) using the SOAP message format, and bindings to the HTTP protocol. SOAP messages can be exchanged over other protocols, but the current specification defines bindings for HTTP. A standard way to document what messages the Web service accepts and generates (e.g., to document a Web Service contract) is by using the Web services description language (WSDL), which is an XML-based contract language jointly developed by Microsoft and IBM that is widely supported by developer tools for creating Web services. Developers also need some way to discover Web services, and a Universal Description, Discovery, and Integration (UDDI) registry specifies a mechanism for Web service providers to advertise the existence of their Web services and for Web service consumers to locate Web services of interest.

Presently, most well-known Web services platforms communicate using HTTP or HTTPS with XML-based formats—specifically, SOAP, WSDL, and UDDI. SOAP is used for remote invocation and is a protocol specification that defines uniform ways of passing XML-encoded data. SOAP also defines a way to perform remote procedure calls (RPCs) using HTTP as the underlying communication protocol. UDDI is the trader of Web service and provides a directory service for Web services in the form of a UDDI registry. UDDI provides a mechanism for clients to dynamically find other Web services. In practice, businesses that want to publish or advertise a service (and its usage interfaces) register or publish the service with the UDDI registry. The published information typically includes binding information that provides technical details necessary to invoke a Web service, such as uniform resource locators (URLs), information about method names, argument types, and the like. Clients that want to obtain Web services of a certain kind use a UDDI interface or other device to query or find Web services in the UDDI registry and receive back locator or identification information for a service along with call-in requirements for invoking the Web service and/or binding an application to the Web service. Communications with the UDDI registry are typically XML-formatted information enveloped in SOAP messages that are sent using HTTP headers. Services are advertised using WSDL, which provides a way for service providers to describe the basic format of Web service requests over different protocols or encodings. WSDL advertisements include XML-formatted information describing what a Web service can do, where it resides, and how to invoke it, and WSDL advertisements are a subset of a UDDI service description.

Most efforts to develop Web services and to promote the use of Web services has emphasized the development of a Web services platform or architecture that is useful with the Internet and intranets. When a business, such as an e-commerce business, wants to provide a new Web service, developers typically start from scratch to create an application, and then manually package the application for use in a particular Web services platform (such as the platform discussed above). This manual creation process can be a relatively time-consuming and complicated process including creating a service, writing service description information or documents, providing transport technology (such as a SOAP message envelope), and publishing the new service as a Web service (such as registering the new Web service with a service registry such as a UDDI registry). Efforts to make existing application, application functions, or services available as Web services have been limited and have not been widely accepted or implemented.

Hence, there remains a need for an improved method and system for generating Web services from existing services or functions. Preferably, such a system and method would be at least partially automated and would allow a Web services developers to interactively create Web services from combinations or integrations of existing services or software modules that are reliable and readily available to existing or new applications and network clients.

SUMMARY OF THE INVENTION

The present invention addresses the above problems by providing a Web services generation method and system that automates (at least partially) the generation of Web services from existing services and, in some cases, existing Web services, to enhance Web services technology. The method and system locate available services using one or more service detectors using varied location techniques and in some embodiments, the services location is performed based on user provided criteria (such as devices or locations to search or service types or identifiers). In practice, the user can then select from the located available services one or more services to be included in the new Web service, which provides a developer with the ability to efficiently combine existing services in new and different arrangements to create Web services with desired combinations of functions. The new Web service can also be configured based on user input.

With the service or services selected, a framework is created for the new Web service including creating a description or contract for the Web services (such as a WSDL-format document), creating a transport structure (such as a SOAP message envelope), and publishing or advertising the new Web service (such as registering the new Web service with a public and/or a private registry, e.g., a UDDI services registry and the like). While supporting existing communication formats such as SOAP, WSDL, and UDDI, the inventive Web services generation method and system provide flexibility in establishing communication formats and readily support the use of formats other than SOAP, WSDL, and UDDI. In this regard, some embodiments of the system and method allow a developer to select among invocation, publishing, and packaging technologies (e.g., communication formats) as part of the generation process (see, for example, FIG. 7), and as new technologies are developed the technologies can be added to the set of technologies displayed by the user interface to the developer (or, alternatively, used by default in the system and method).

More particularly, a computer-based method is provided for generating a Web service for use over a digital communications network. The method includes identifying first and second service components (e.g., callable method or methods that provide a function) for inclusion in the new Web service. Such identifying may include locating available services using one or more service detectors that use one or more search techniques and that may be selected by a user and then displaying the located services to the user to allow the user to make a selection to identify the first and second service components. The method continues with generating a description or contract for the new Web service defining any invoking rules or providing a calling structure based on the first and second components and their calling and input/output rules. A transport structure is then created for accessing the new Web service and in one embodiment, the transport structure comprises a SOAP message envelope but this may vary depending on the communications network or adoption of different transmissions protocols for Web services. The new Web service is then advertised as being available on the communications network. The advertising may be performed on user input advertising instructions and may include registering the new Web service with a services registry linked to the communications network (such as a UDDI registry).

BRIEF DESCRIPTION OF THE DRAWINGS

FIG. 6 is another screen shot similar to FIGS. 3-5 illustrating a box or window created by the user interface for prompting a user for input and output mapping for the new Web service;

FIG. 7 is yet another screen shot similar to FIGS. 3-6 showing a box or window created by the user interface for prompting a user to request the generation of the user-defined Web service and allowing the user to select the technologies used for invocation, publishing, and packaging of the new Web service.

DETAILED DESCRIPTION OF THE PREFERRED EMBODIMENTS

In general, the present invention is directed to a tool, and method, for facilitating the generation of new Web services based on existing service components or services to reduce the need for starting from scratch or reinventing functions for each Web service. In this regard, a "service" or "service component" is any individual action or function or combinations of actions and functions that can provide functional behavior (e.g., such as callable method, an application or portion of an application, and the like) and a "Web service" is a single service or combination of services (or combination of services and existing Web services) that is configured for use over a network (e.g., by providing a Web services description, by preparing the service or services for transport on the network, and by publishing or advertising the service or services as a Web service including registering the Web service with a private or public Web services registry). The tool and method provides an approach to perform automatic detection of existing services and Web services and generation of a new Web service using one or more of the existing services and/or Web services selected by a developer. In practice, the Web generation tool and method allows for developers to pick and choose among numerous existing applications to selectively enable technologies as Web services. The Web generation tool can be thought of as an administrative resource for the developer that is often created or implemented in modular fashion such that the services to Web services conversion performed by the tool can be performed for nearly all programming models or platforms including the many method-based programming technologies (i.e., the tool and methods are not limited to a particular programming method or even to a particular Web services platform).

Figure 1:
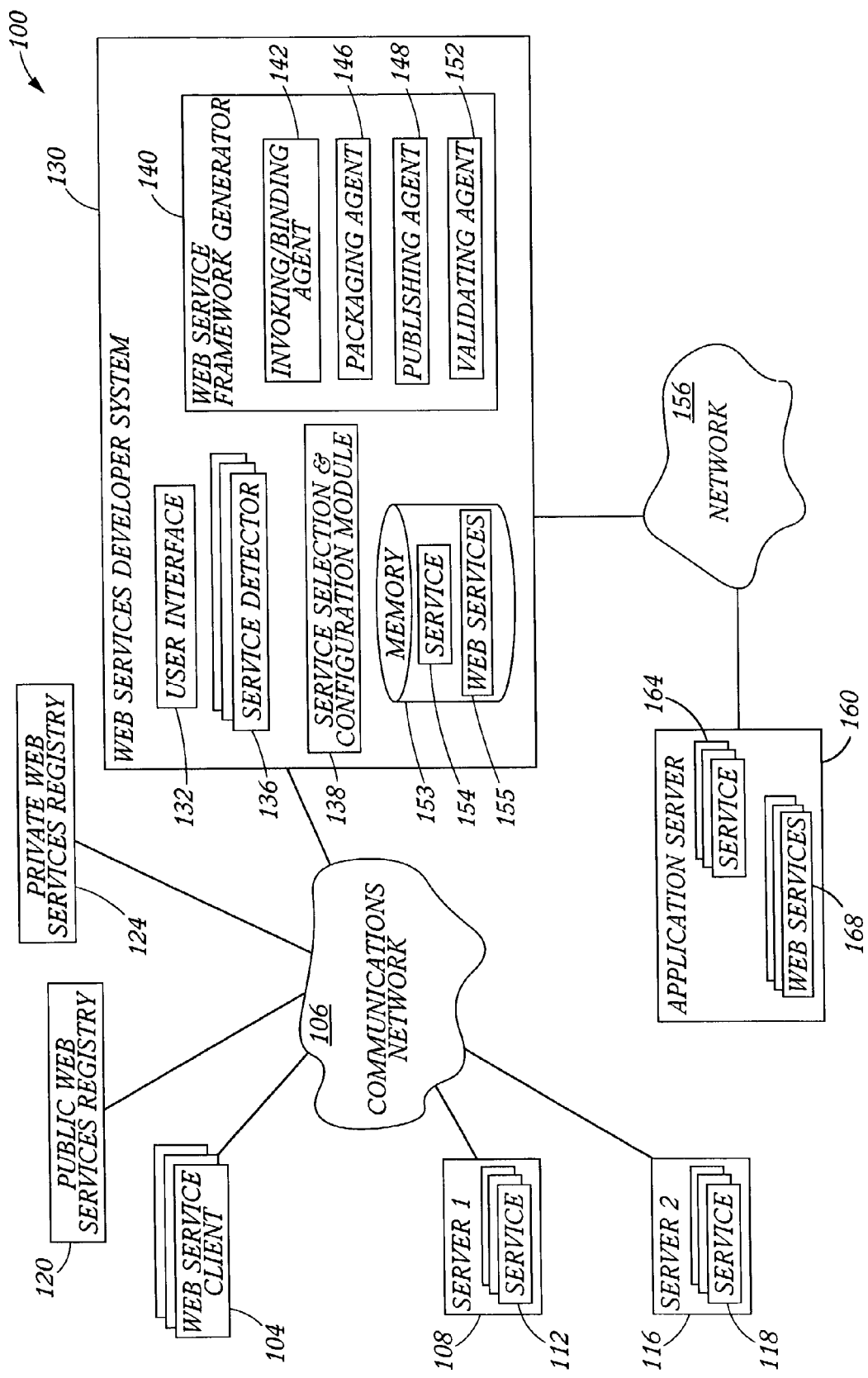
FIG. 1 illustrates in block diagram form a Web services generation system according to the present invention showing a Web services developer system utilizing automated tools for Web service creation and advertising.

FIG. 1 illustrates a simplified embodiment of an automated Web services generation system 100 according to the invention. The methods and/or functions of the invention can be implemented using numerous electronic and computer devices (e.g., a variety of hardware such as data or application servers) and with one or more applications or software programs useful for performing the underlying, described tasks (e.g., Web browsers, text editors, graphical user interfaces, communication managers, database and memory managers, and many more software tools well-known in the computer arts). As illustrated, the system 100 includes a number of Web service clients 104 and service providers 108, 116 shown as a first and second server running a number of services 112, 118 (e.g., a simple method callable with a GET, POST, PUT or other command or combination of methods, function, and/or applications). A public Web services registry 120 (such as a UDDI registry) is provided that provides a directory or advertises a plurality of registered Web services generally to any client 104. A private Web services registry 124 is provided that advertises registered Web services but typically allows access based on one or more criteria such that the registered Web services are available only to a limited subset of the Web service clients 104. The clients 104, service providers 108, 116, and registries 120, 124 are in communication via a communication network 106 (e.g., the Internet, a LAN, a WAN, and the like) and communication links (e.g., any suitable data communication link, wired or wireless, for transferring digital data between two electronic devices).

The Web service clients 104 operate to query, such as with a UDDI interface, the Web service registries 120, 124 and are provided access to Web service descriptions indicating a location of particular Web services in the system 100 as well as invoking rules or rules to run the particular Web service or bind the Web service to an application. The Web service clients 104 then remotely invoke the Web service from a service provider 108, 116, 160 (or, in some cases, developer system 130) using inputs as required by the Web service description with the Web service most likely be wrapped in a transport envelope (such as transport technologies defined by SOAP). Inputs and outputs of the Web service often include markup language-formatted information (such as XML-formatted information) with communication protocol headers appropriate for the communications network 106 (such as HTTP headers).

In the following discussion, computer and network devices, such as user or clients 104, service providers 108, 116, 160, registries 120, 124, and the Web service developer system 130 are described in relation to their function rather than as being limited to particular electronic devices and computer architectures. To practice the invention, the computer devices and network devices may be any devices useful for providing the described functions, including well-known data processing and communication devices and systems such as personal digital assistants, personal, laptop, and notebook computers with processing, memory, and input/output components, and server devices configured to maintain and then transmit digital data over a communications network. Data, including client requests, service provider and developer system requests and responses, and transmissions to and from the registries 120, 124 is typically communicated in digital format following standard communication and transfer protocols, such as TCP/IP, HTTP, HTTPS and the like, but this is not intended as a limitation of the invention.

The system 100 further includes a Web service developer system 130, which may physically be implemented using a variety of hardware and software devices including a server, data storage devices, personal computers with data input and monitors for viewing and inputting data. Generally, the developer system 130 includes components that function to the system 130 to locate existing services and Web services and to generate new Web services based on one or more of these located existing services. The Web services developer system 130 is linked to the communications network 106 to allow it to locate services or service components existing on service provider servers 108, 116 as well as within the developer system 130. The developer system 130 is further linked to another network 156 (such as an Intranet) to allow the system 130 to locate service components or services on an applications server 160 (such as any server device that is not publicly accessible via the communications network 106), which may be services 164 such as standard callable methods and also, in some cases, Web services 168 (i.e., services that have been already configured with framework for use over the network 156 and/or 106 as a Web service).

The Web services developer system 130 includes a user interface 132 for displaying information to an operator (such as a developer) of the system 130, including prompts for operator input, and for receiving operator input that is used in locating services and/or in generating new Web services (as explained in detail with reference to FIGS. 2-7). The user interface may utilize any number of well-known graphical user interface (GUI) devices such as dialog boxes, pull down lists with selectable items, and buttons and even use touch screens and audio interfaces for receiving input.

One or more service detectors 136 are provided to detect and/or locate existing services (and in some cases, Web services) that are available for use in creating a new Web service. Each detector 136 may utilize a different technique for performing the look up of existing services and may vary with each type of service. For example, a different detector 136 would be provided for locating enterprise JavaBeans™ (EJBs), for locating legacy applications, and for searching function libraries. The look up or identification of available services is preferably performed automatically but may utilize operator input including information on types of services to locate (such as an instruction to only look for EJBs or to look for EJBs and a particular type of legacy application utilizing another programming model) and information on locations of services (such as by providing servers to access or pathing information, e.g., provide an instruction to search one or more of the service providers 108, 116, 160 and the developer system 130 or portions thereof). In a Java-based environment, a user may identify a Java™ archive file and the tool would identify class files and then find classes with methods that can be called. The services discovery performed by the detector 136 may be based on server identity (such as server 108, 116, 160) and the detector 136 would discover the servers 108, 116, 160 automatically based on standard pathing information or manually through user specification. The location of services may include the service detector 136 querying a standardized naming or registration service (such as Java™ Naming and Directory Interface (JNDI) and similar services), using a direct query method (such as Java™ reflection and the like), or using a direct specification of a service provided by the operator. In some embodiments, the service detector 136 would be adapted to allow users via the user interface 132 to perform a test query to verify that the service provider system 108, 116, 160 (or developer system 130) was accessible by the operator and that the services being located were available for use.

A service selection and configuration module 138 is included allow an operator (such as by responses to prompts provided by the user interface 132) to select from the available services located by the service detector a number of services for inclusion in the new Web service being created by the system 130. In addition to selecting services, the service and selection module 138 allows the operator to select the order or relationship of the selected services within the new Web service (such as order of performing the various services and allow nesting and other relationships between the selected services). In practice, the service and selection module 138 allows the operator to select a single existing service from the services 112, 118, 168 and the new Web service is created as a wrapper around the selected service. Alternatively, the developer interacts with the module 138 to select a combination of existing services 112, 118, 168 for use in the new Web service. In this case, module 138 is adapted to retrieve information from the developer for how the services are to be combined. For example, the new Web service may involve a linear series of service invocations (as shown in the example of FIGS. 3-7) or may involve a more complex or sophisticated sequence of calls. In some embodiments, a service call language can be utilized within the Web services developer system 130 that supports additional behaviors such as conditional execution, branching, and flow control statements in the new Web service.

In some embodiments, the module 138 is adapted to allow an operator to configure the selected services such as by prompting the operator to select from a number of configuration options and then applying any selected configurations to the selected services. Such configuration options may include synchronous or asynchronous calls and invoking or running rules (such as how the Web service or individual services within the Web service are to be invoked, be bound to applications, be processed or routed to other services on the same or other servers, and the like). Memory 153 is provided for, in some cases, storing located services 154 for additional processing and for storing, again in some but not all cases, Web services created by the developer system 130.

A Web service framework generator 140 is provided to create the new Web service from the available services (and/or Web services) 112, 118, 164, 168 selected by the operator, and such generation includes automatically generating a framework for enabling the service(s) as a Web service over the communications network 106 and/or network 156. The framework created can vary somewhat (such as to comply with differing definitions of a Web service such as those provided by NET by Microsoft Corporation and Sun ONE by Sun Microsystems, Inc. or to suit a particular embodiment of the system 100) with, at least in some cases, service invocation being enabled through any suitably universal distributed technology or protocol. The generator 140 includes an invoking/binding agent 142 useful for defining a framework for invoking the new Web service by defining required inputs and outputs, how the Web service will be bound to applications, how requests (including, if required, translation and routing code) are processed, and other invoking/binding rules, which each may be affected by configuration input provided by the operator and collected by the service and selection configuration module 138. Typically, the invoking/binding agent 142 would then generate a description of the new Web service that defines such binding or invoking rules that need to be followed to run the new Web service, e.g., defines the call structure for the new Web service. In addition to producing the descriptors for the Web service, the agent 142 produces the invoker code that coordinates running the set of services in the new Web service. The "invoker code" would typically be code that interprets the SOAP or other packaging technology request and ultimately, coordinates running the set of services. In one embodiment, the agent 142 uses WSDL to create descriptors or a contract for the new Web service but, of course, other technologies or languages can be used to create such descriptors and may be varied depending on the requirements of the registries 120, 124.

A packaging agent 146 acts to generate structures required to transmit service requests for the new Web service. In existing Web services platforms, the packaging agent 146 can act to create a SOAP envelope structure for transporting service requests for the new Web service. In some embodiments, the packaging agent 146 works with the user interface 132 to provide an operator with a set of transmission options which the operator can select to cause the packaging agent 146 to create a different transmission structure for the new Web service and particularly for transmittal of service requests for the new Web service (i.e., in systems 100 in which more than one technique is used for transmitting requests, such as if SOAP were supplemented with other transmission protocols).

A publishing agent 148 is provided in the generator 130 to automatically advertise or publish the new Web service. The publishing agent 148 acts to register the new Web service with the public Web services registry 120 and/or with the private Web services registry 124 (both of which may or may not be directories or registries using UDDI). In some embodiments, the publishing agent 148 works with the user interface 132 (and sometimes the selection and configuration module 138) to request and receive input from the operator as to how to advertise the new Web service and where, such as by placing restrictions on who may access the new Web service. In other words, the operator may indicate whether the Web service is registered with one or both of the registries 120, 124 or simply made available through the developer system 130 (or even provided at application server 160 as a Web service 168 to clients via the network 156). A validating agent 152 is provided to test the newly created and published Web service to determine if the new Web service is constructed properly and is available, such as by attempting to use the new Web service based on the created description.

Figure 2:
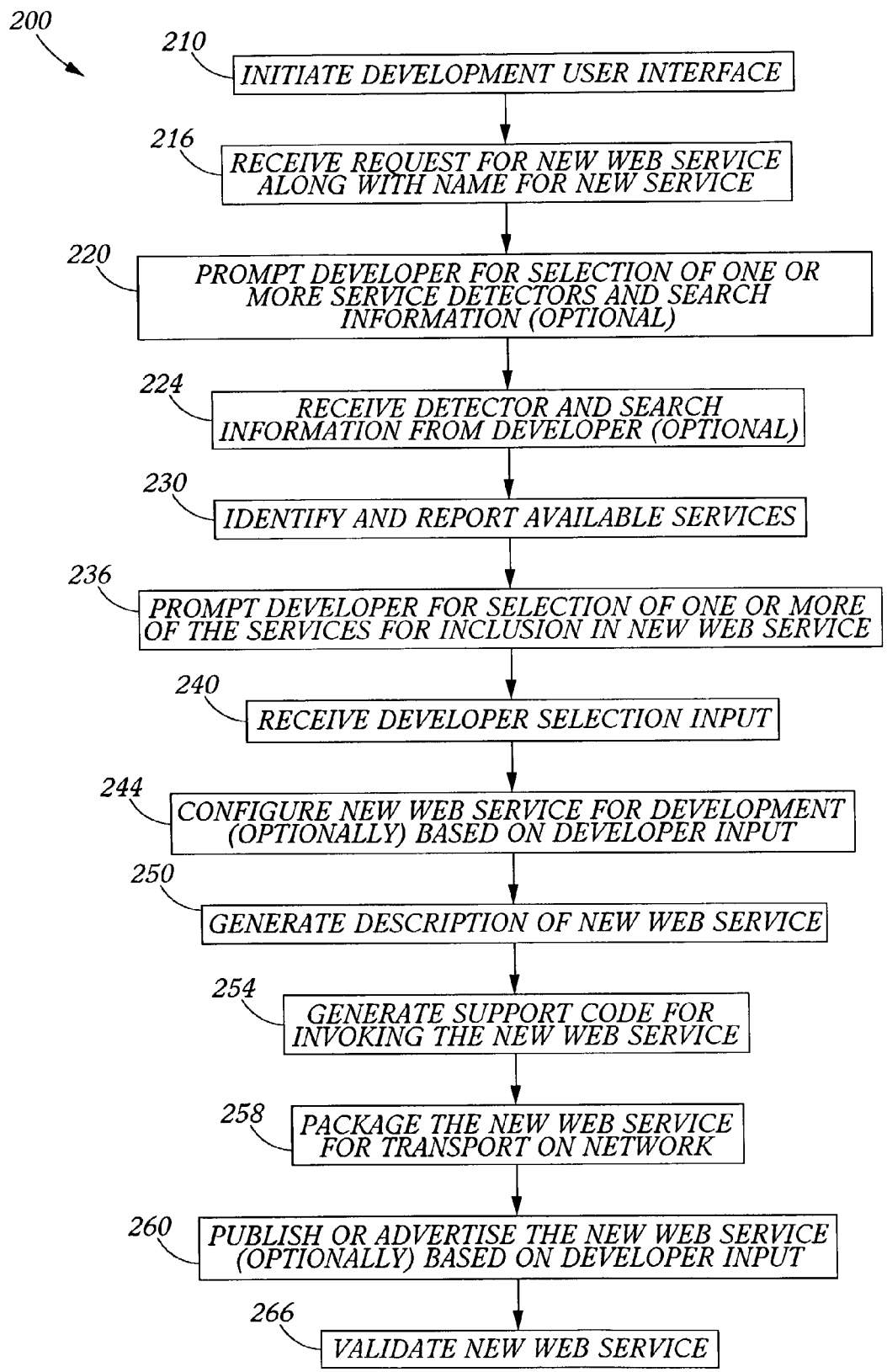
FIG. 2 is a flow chart illustrating functions performed during a web generation process of the invention, such as by the components of the web services developer system shown in FIG. 1.
Figure 3:
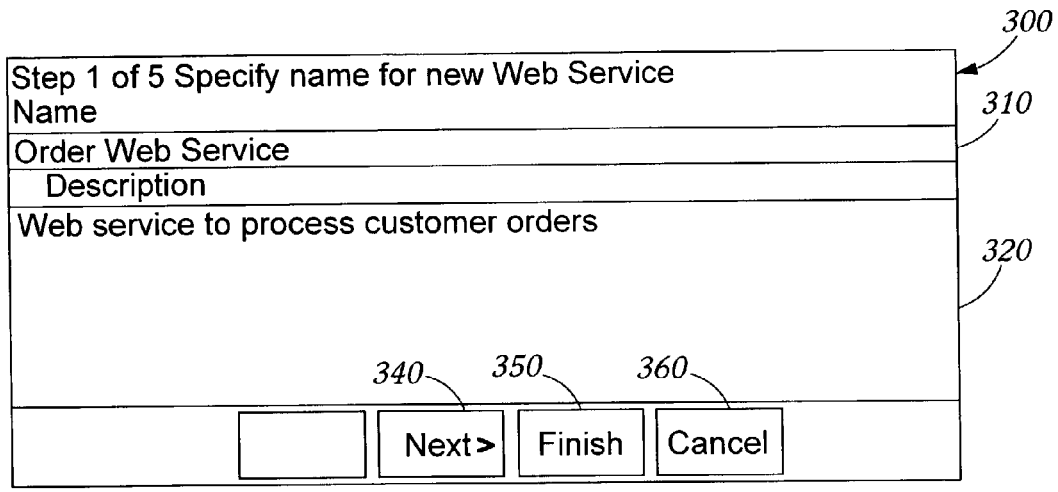
FIG. 3 is a screen shot of an initial service request or naming input window or box provided by the user interface of the web service developer system of FIG. 1.

FIG. 2 illustrates an exemplary Web service generation process performed by the Web services developer system 130 during operation of the system 100. As shown, the process 200 begins with the initiation of a development user interface such as by operating the user interface 132 in response to a request from a developer to generate a new Web service to display process 200 information and to collect input from the developer. At 216, a request is received for a new Web service such as via user interface 132 along with a name or identifier for the new Web service. For example, the user interface 132 may utilize a GUI wizard to display an input box 300 shown in FIG. 3 requesting at input portion 310 the operator to enter a name for the new Web service and requesting a description of the new Web service in input portion 320 of box 300. Buttons 340, 350, 360 are provided to allow the developer to navigate to later steps in the process 200 or to end the process 200.

Figure 4:
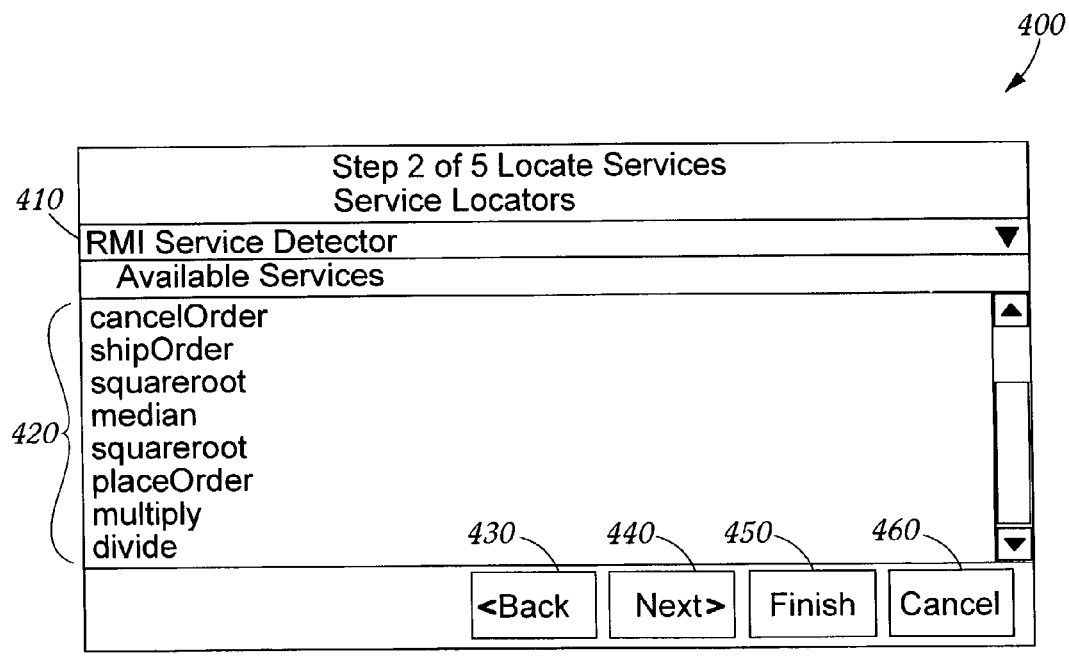
FIG. 4 is another screen shot similar to FIG. 3 showing a services locator input window or box showing user selection of a services detector and displayed results of a services search.

At 220, the process 200 continues with the developer being prompted via user interface 132 to select one or more service detectors 136 for locating or looking up available services 112, 118, 154, 155, 164, 168 in the system 100. In some embodiments, this step 220 is not performed as detection is automated with one or more detectors being implemented to search all or portions of the system 100. At 220, the developer can also direct the search for services by providing specific search criteria such as locations or devices to search, paths to search, and other criteria. At 224, the detector and search information is received from the developer, such as via the user interface 132 (except in auto detect embodiments or processes). For example, FIG. 4 illustrates an input box 400 that may be displayed to a developer to obtain selection information, e.g., by selecting one or more service detectors from a pulldown list 410. As shown at 410, the developer has selected an RMI service detector 136 that acts to locate available services from services 112, 118, 154, 155, 164, 168 by locating services that utilize remote method invocation (RMI). Of course, many other techniques can be used to locate available services in the system 100 including querying a standardized registration service, through direct queries, and the like and may include developer provided specifications of services.

Figure 5:
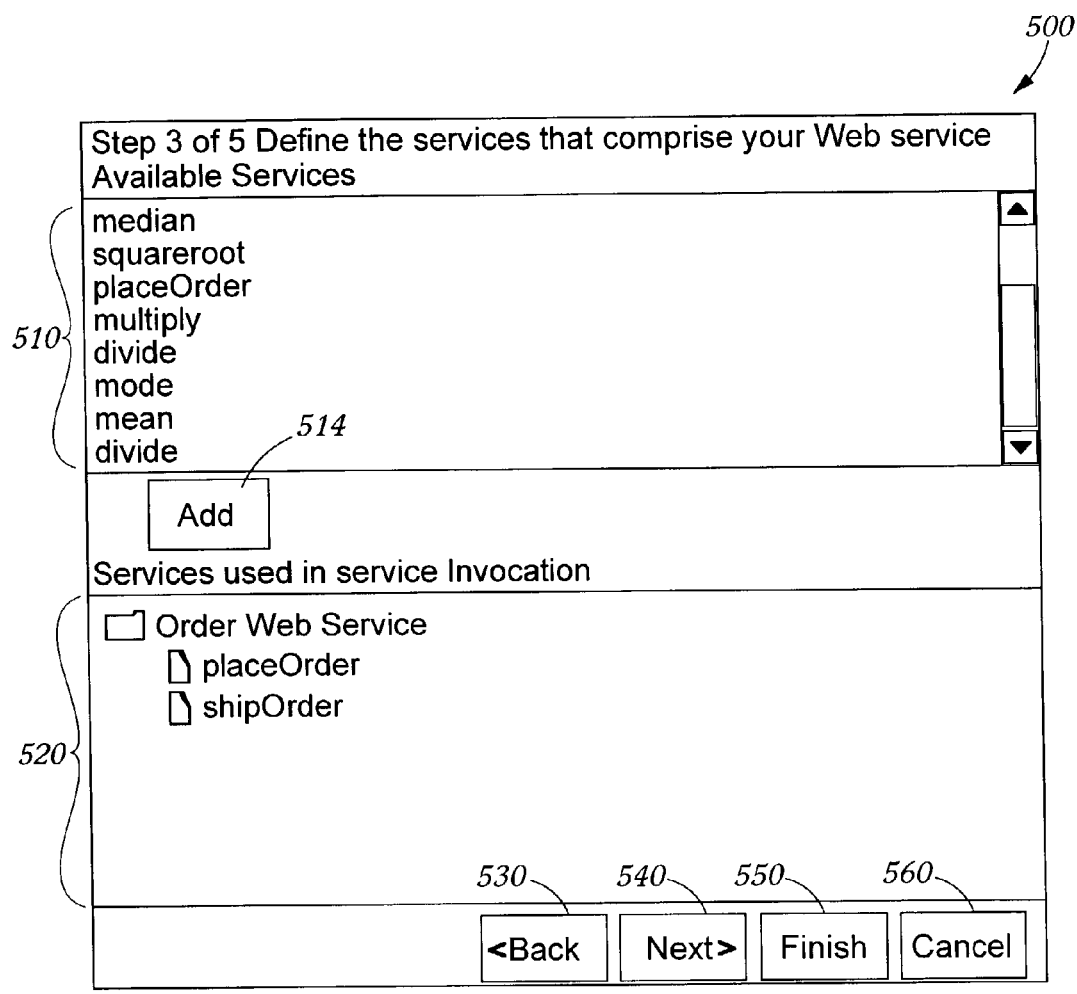
FIG. 5 is another screen shot similar to FIGS. 3 and 4 showing a services selection window or box illustrating a user's ability to select one or more of the available services for inclusion in a new Web service.

At 230, the available services are identified by the service detector 136 (selected by developer or default of system 130) and the located services are reported to the developer. For example, the located services may be displayed in an available services portion 420 of an input box 400. The input box 400 further includes navigation/input buttons 430, 440, 450, and 460 to allow the developer to move within the process 200 such as to steps 220 and 236. At 236, the process 200 continues with prompting the developer for selection of one or more of the identified and reported available services for inclusion in the new Web service or to make available as Web services. As shown in FIG. 5, an input box 500 is provided with an available services portion 510 listing the available services that can be included in the new Web service, such as by selecting service in the box portion 510 and selecting the "ADD" button 514. Services that have been selected for inclusion in the new Web service are shown in box portion 520 under the name or identifier of the new Web service. Typically, such services are shown in the order they are to be invoked, and in some embodiments, the input box 500 (and service selection and configuration module 138) are adapted to allow the developer to reorder the selected services in box portion 520 and to nest or otherwise define the hierarchy or relationship between the selected services. Navigation buttons 530, 540, 550, and 560 are provided to allow the developer to move within the process 200 or to terminate the process 200. At 240, the service selection and configuration module 138 receive the input from the developer indicating which of the available services are to be included (and in which order) in the new Web service.

The steps 236 and 240 may also include receiving configuration information from the developer (such as via user interface 132) for one or more of the selected available services. At 244, the Web service framework generator 140, such as with the invoking/binding agent 142, acts to configure the new Web service for deployment. In some embodiments, this configuration or generation of deployment framework is performed based on developer input (such as to whether calls are synchronous or asynchronous). Such configuration input from the developer may also include input and output mapping information. FIG. 6 illustrates an input box 570 that is created by the user interface 132 to prompt a developer or operator to identify input and output values and characteristics that the invoking agent 142 can use in creating invoking code. Once the developer has selected specific services for inclusion in the new Web service or composite service, the developer can specify the required inputs for each of the selected services. As shown in FIG. 6, a GUI window 570 displays the inputs and outputs for a service. It displays the data type for the input 576, 586 and output 593 values. It prompts the developer for a first input at box 574, for the source 578 of the data, and the value 580. Likewise, the GUI window 570 prompts the developer for a second input at box 584, for the source 588 of the data, and the value 590. In this manner, input and output mapping information is received from the developer for each input and output for each of the selected services in step 240. Navigation buttons 594, 596, 597, and 598 are provided to move within the process 200 and/or to terminate the process 200. The inputs may originate from a number of sources (with available sources being displayed in pull down lists at 578, 588) including, but not limited to, literal value inputs such as programmer or system administrator input, output values from other services (within the particular new Web service or other existing services), inputs from a user or client of the Web service, and/or other input sources. It is additionally possible in some embodiments of the invention that the method of specifying input-output mapping may be extended to service characteristics such as error handling and the like.

As shown in FIG. 7, an input box 600 may prompt the developer to select a "FINISH" button 620 or otherwise indicate that steps 244-266 should be performed to generate and finalize the new Web service. Alternatively, the developer may select a "BACK" button 610 to return to step 236 or a "CANCEL" button 630 to terminate the process 200. In some embodiments, the developer is allowed to accept default technologies for use by the Web service framework generator 140 to control invocation, publishing, and packaging of the new Web service or to select which technologies are to be used for the new Web service from a set of available technologies (all presently available technologies or a selected subset of such technologies). Referring to FIG. 7, the GUI window or box 600 includes selection buttons 602, 606, 608 that a developer can use to accept the displayed default technology or to select from a list of technologies shown in a pull down list for invocation or invoking code, publishing, and packaging, respectively. The list of technologies that may be chosen can readily be updated based on the creation or adoption of new communication formats and protocols in the Web services industry. Additionally, the displayed protocols or technologies can also be filtered to force compatibility among the selected technologies. For example, once an invocation technology is selected at 602, the publishing and packaging technologies that are displayed for selection at 606, 608 are only those compatible with the selected invocation technology (which in many cases may be all publishing and packaging technologies).

As can be appreciated, the technology selection feature of the system 130 and process 200 provides a developer the ability to control how a new Web service is invoked, published, and packaged. This is a useful feature for modifying existing Web services (such as Web services 168) by simply selecting an existing Web service and then modifying the technologies used to invoke, publish, and/or package the Web service, which can be done without changing how the underlying service runs. In some embodiments, the selection of one of the technology selection buttons 602, 606, 608 will lead to the displaying of additional dialog boxes that allow a developer to configure the particular selected technology. For example, when the publishing technology is selected at 606 to be UDDI, a dialog box (not shown) may be displayed by the user interface 132 requesting the developer to specify the URL that would provide the target for registering the newly created Web service.

Once configured, at 250, the invoking/binding agent 142 acts to generate descriptors or a contract for invoking or binding the new Web service that defines the rules for calling and running the new Web service and provides additional information that may be required by a particular Web service registry 120, 124. The descriptors may be created using WDSL to facilitate use of the new Web service with common Web services platforms or any other description language presently being used in a particular system 100. At 258, the invoking agent 142 functions to produce the code to invoke the composite services, which can be thought of as support code useful for invoking the new Web service.

At 258, the generation process 200 continues with the packaging with the packaging agent 146 the available services for transport on the network 106 (and/or network 156). For example, a transport envelope (such as SOAP message envelope) can be generated for enclosing or wrapping of service requests or other service-related communications. At 260, the process 200 continues with the publishing or advertising the new Web service for use in the system 100. In one embodiment, advertising involves registering the new Web service with one of or both of the registries 120, 124, and such advertising vary depending on whether the registry 120, 124 is a UDDI-type service registry or a registry based on another technology. In some embodiments, step 260 involves prompting the developer via the user interface 132 for input on how to advertise or publish the new Web service and where, which allows the user to specify which registries 120, 124 are utilized (if any) and to place access restrictions on the new Web service (such as allow use by business partners but not competitors or by clients in certain geographic areas but not others). At 266, the new Web service is validated to check on whether the previous generation steps had been performed correctly such that the new Web service can be located in a registry 120, 124 and properly accessed and run using the rules stated in the created Web service description from step 250.

In practice, the process 200 is useful for providing an administrative tool for not only locating available services but for also combining such located services in any useful order and combination based on user input. Additionally, one or more of the steps in process 200 can be repeated to further modify the newly created Web service or to build new Web services using the now published (and typically registered) Web service as a building block Web service. In other words, the process 200 can locate services that are already configured for use as a Web service and modify its existing configuration or combine the building block Web service with one or more other Web services and/or one or more existing and located services.

Figure 8:
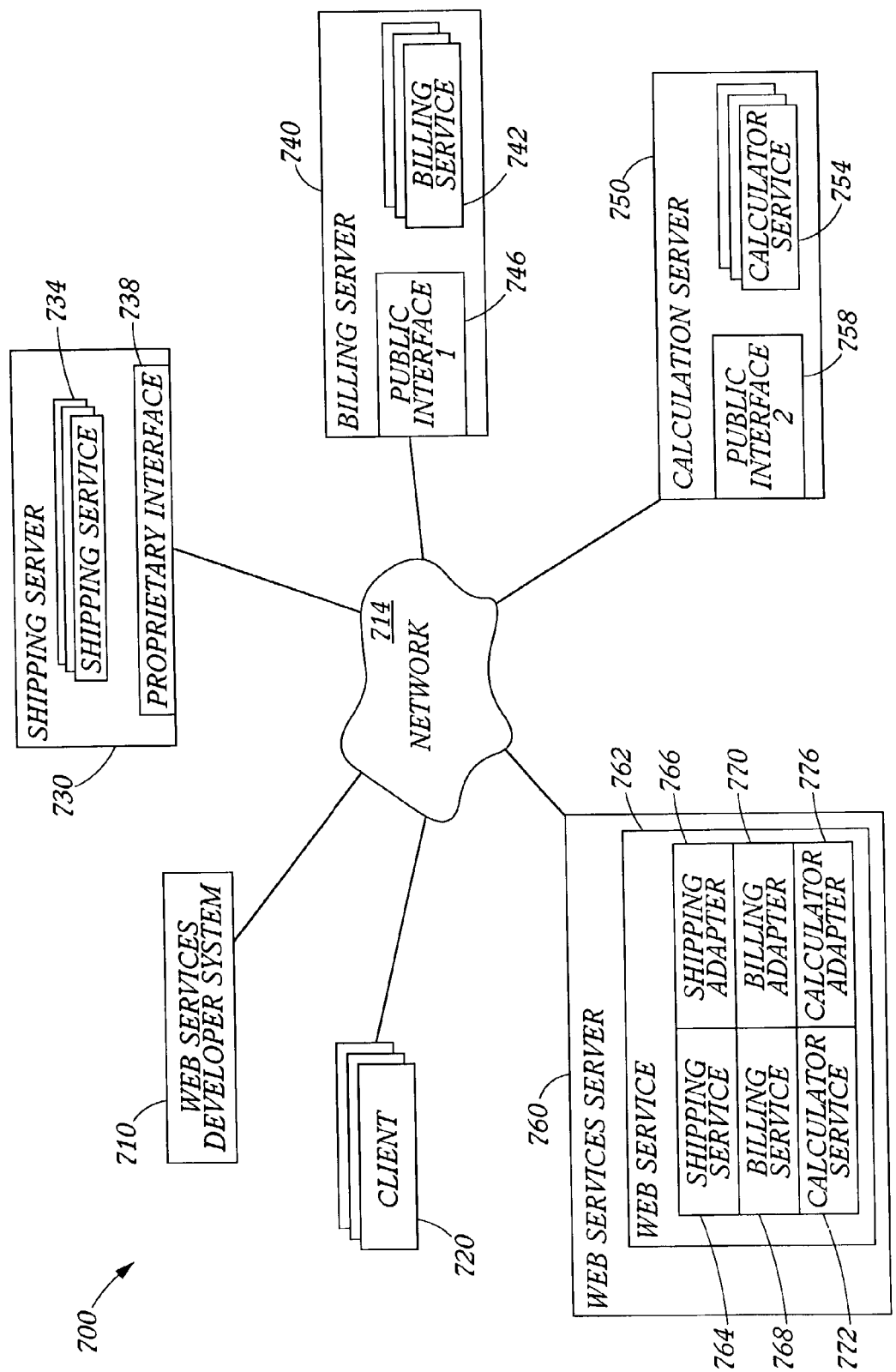
FIG. 8 illustrates in block diagram form another web generation system of the invention illustrating the generation of a Web service having specific adapters to enable a created new Web service to be properly invoked.

FIG. 8 illustrates another automated Web services generation system 700 useful for illustrating the creation of a Web service that is able to run properly within a system 700 that may include a variety of computing models and/or interfaces to systems and data. As shown, a Web services developer system 710 is provided with components and functionality similar to system 130 of FIG. 1. Web services clients 720 are linked to the network 714 along with the system 710 and a number of service providers 730, 740, 750. Each of the service providers 730, 740, 750 runs a service specific to that provider 730, 740, 750 (such as a shipping function 734, a billing function 742, a calculator function 754, and the like) which may be usefully combined to create a more sophisticated Web service. Interestingly, each of the service providers 730, 740, 750 uses a different interface (or set of invoking and communication rules) for the services 734, 742, 754 they provide. These interfaces are shown as being a proprietary interface 738 (which is specific to the shipping server 730), a first public interface 746 (which is a standard interface publicly available), and a second public interface 758 (which is another standard interface that is publicly available but that is different from the interface 746). Hence, to access and run the services 734, 742, 754, service requests or methods of invoking the services 734, 742, 754 need to be compliant with the corresponding interfaces 738, 746, 758.

In this regard, the Web services developer system 710 is adapted such that it locates services 734, 742, 754 and creates a new Web service 762 shown being run on server 760. The new Web service is created (such as based on selection of a set of services by a developer from available services identified by the Web services developer system 710) to include a shipping service 764, a billing service 768, and a calculator service 772. The Web services developer system 710 is configured to find services 734, 742, and/or 754 which it can run or configure to run. The developer system 710 acts to create (if necessary) an adapter for enabling the services 764, 768, 772 to run within the system 700 and to communicate properly with the services 734, 742, 754, which allows these services 764, 768, 772 to be combined and offered as a Web service 762 to clients 720. As illustrated, adapters 766, 770, and 776 are provided to enable the services 764, 768, and 772 to run and comply with any rules applicable to the services 734, 742, 754 and/or their interfaces 738, 746, 758. For example, in a Java embodiment, the services 764, 768, 772 may be coordinating classes while the adapters 766, 770, 776 may be invoker classes unique to the appropriate service interface 738, 746, 758 (and/or service 734, 742, 754).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, by modularizing the interfaces to the components or technologies shown in the Web services developer system 130 in FIG. 1, the automated generation of Web services can be generic or platform independent. Genericity is provided for the service providers as the system 130 can be designed in some embodiments to perform autodetection of existing services created or based on any method-based programming model. For example, auto-detection can be adapted for searching for enterprise Java™ bean (EJB) components, regular Java™ code, CORBA server components, CORBA server interfaces as hosted by an ORB, and many other "services." Genericity can be provided for generating the services in some embodiments by allowing a developer to select from a number of transport mechanisms, rather than only using SOAP to prepare a new Web service for transport. Other transport or ways to publish a Web service to the Web or other communications media can be provided in addition to or in place of the described SOAP techniques, such as a plug-in to convert or prepare a new Web service for RPC-communication. Genericity for advertising the new Web services can be implemented to supplement advertising based on WSDL for descriptions and UDDI for registration as other advertising technologies are developed and adopted by the Web services industry. To provide enhanced plug and play, Java™ or another useful programming language can be used to describe the functions of the Web services developer system 130 of FIG. 1 as a series of interfaces and then as Web services technologies change (such as SOAP, WSDI, or UDDI being replaced) different interfaces can be substituted to function better with the new Web services platform or technologies.

The Web services developer system 130 is useful for converting existing Web service 168 to a new Web service that utilizes differing technologies. This is accomplished by a developer selecting the existing Web service 168 (as shown in FIG. 5) and then selecting a new set of invocation, publishing, and/or packaging technologies (as shown in FIG. 8). The tool or system 130 then functions to generate a new support structure for the new Web service around the previously created or existing invoker code of the existing Web service.

I claim:

1. A computer-based method for generating a Web service for use over a digital communications network, comprising:
    identifying first and second service components adapted for providing a first and a second functionality for inclusion in a new Web service, wherein the first and second service components comprise callable methods not configured as Web services on the digital communications network as the callable methods lack invoking rules and transport structure to configure the callable methods as Web services for use over the digital communications network;
    generating a single description of the new Web service including a calling structure based on the first and second service components;
    creating a transport structure for requests to and responses from the new Web service suited for data transfer over the communications network; and
    advertising the new Web service on the communications network.

2. The method of claim 1 wherein the identifying of the service components includes locating available service components.

3. The method of claim 2, wherein the locating includes searching one or more devices linked to the communications network for callable methods.

4. The method of claim 2, wherein the locating is performed based on user-input location or identification information.

5. The method of claim 2, wherein the identifying includes reporting the available service components and receiving a user-input selection of the first and the second service components from the reported available service components.

6. The method of claim 5, wherein the user-input selection defines a relationship between the first and the second service components.

7. The method of claim 1, wherein the transport structure includes a SOAP message envelope.

8. The method of claim 1, wherein the advertising includes registering the new Web service with a Web services registry.

9. The method of claim 8, wherein the registry is a UDDI-based registry.

10. The method of claim 1, wherein the description includes WSDL formatted information.

11. The method of claim 1, wherein the identifying of the first and second components includes using a first service detector operable for detecting service components based on a first criteria to locate the first component and using a second service detector operable for detecting service components based on a second criteria differing from the first criteria to locate the second component.

12. The method of claim 11, further including displaying a set of service detectors including the first and the second service detectors and receiving a user-input selection of the first and the second service detectors from the set of service detectors.

13. A method for generating a Web service, comprising:
    receiving an identification of an available service adapted for providing functional behavior, the available service lacking invoking rules and transport structure to configure the available service as a Web service for use over a communications network;
    generating a description of invoking rules for the available service;
    creating a transport structure for client messages to and from the available service over the communications network;
    publishing the available service as a Web service accessible over the communications network, wherein the Web service provides at least the functional behavior over the communications network; and
    receiving a technologies selection input, wherein the generating, creating, and publishing are performed based on the received technologies selection input.

14. The method of claim 13, wherein the publishing includes registering the Web service with a Web service registry linked to the communications network.

15. The method of claim 14, wherein the Web service registry is a UDDI-based registry.

16. The method of claim 13, wherein the publishing includes advertising the Web service for access to the available service based on user-input criteria and based on the invoking rules.

17. The method of claim 13, the creating a transport structure includes adding transfer protocol headers to the client message based on the communications network.

18. The method of claim 13, wherein the transport structure comprises a SOAP message envelope.

19. A computer-based method for generating a Web service from existing services available on a computer system, comprising:
    locating a first set of available services on the computer system using a first services searching technique;
    locating a second set of available services on the computer system using a second services searching technique differing from the first services searching technique;
    displaying the first and second sets of available services to a user;
    receiving user input selection information indicating at least one of the available services to include in the Web service; and
    generating a Web services framework for the indicated at least one of the available services to allow the indicated at least one of the available services to be used, located, and accessed by a client device using Web service standard communications over a digital communications network.

20. The method of claim 19, wherein the first or the second services searching technique includes querying a naming service.

21. The method of claim 19, wherein the first or the second services searching technique includes using a direct query method.

22. The method of claim 19, further including displaying to the user a set of services searching techniques and receiving input from the user indicating selection of the first and the second services searching techniques from the displayed set of services searching techniques.

23. The method of claim 19, further including receiving search criteria from the user and wherein at least one of the first and the second services searching techniques are performed based on the received search criteria.

24. An apparatus for generating a Web service for use over a digital communications network, comprising:
    means for identifying first and second service components adapted for providing a first and a second functionality for inclusion in a new Web service, wherein the first and second service components comprise callable methods not configured as Web services on the digital communications network;
    means for generating a description of the new Web service including a calling structure based on the first and second service components;
    means for creating a transport structure for requests to and responses from the new Web service suited for data transfer over the communications network; and
    means for advertising the new Web service on the communications network.

25. The apparatus of claim 24, wherein the means for identifying the service components includes means for locating available service components.

26. The apparatus of claim 25, wherein the identifying means includes means for reporting the available service components and means for receiving a user-input selection of the first and the second service components from the reported available service components.

27. The apparatus of claim 24, wherein the advertising means includes means for registering the new Web service with a Web services registry.

* * * * *